(12) United States Patent
Kawakami et al.

(10) Patent No.: US 8,586,190 B2
(45) Date of Patent: Nov. 19, 2013

(54) INORGANIC—ORGANIC HYBRID-FILM-COATED STAINLESS-STEEL FOIL

(75) Inventors: Keiko Kawakami, Futtsu (JP); Noriko Yamada, Futtsu (JP); Takeshi Hamada, Futtsu (JP); Yuji Kubo, Futtsu (JP)

(73) Assignee: Nippon Steel & Sumikin Materials Co., Ltd., Tokyo (JP)

( * ) Notice: Subject to any disclaimer, the term of this patent is extended or adjusted under 35 U.S.C. 154(b) by 543 days.

(21) Appl. No.: 12/831,027

(22) Filed: Jul. 6, 2010

(65) Prior Publication Data

US 2010/0272957 A1 Oct. 28, 2010

Related U.S. Application Data

(62) Division of application No. 10/550,747, filed as application No. PCT/JP03/10087 on Aug. 7, 2003, now abandoned.

(30) Foreign Application Priority Data

Mar. 27, 2003 (JP) ................................. 2003-087950

(51) Int. Cl.
*B32B 15/04* (2006.01)

(52) U.S. Cl.
USPC ............................ 428/447; 428/336; 428/213

(58) Field of Classification Search
USPC ................................................ 428/141, 447
See application file for complete search history.

(56) References Cited

U.S. PATENT DOCUMENTS

| | | | |
|---|---|---|---|
| 5,595,826 A | 1/1997 | Gray et al. | |
| 6,068,884 A * | 5/2000 | Rose et al. | 438/762 |
| 6,416,869 B1 | 7/2002 | van Ooij et al. | |
| 2001/0041766 A1 | 11/2001 | Wielstra et al. | |
| 2002/0156180 A1 | 10/2002 | Yamada et al. | |
| 2003/0012882 A1 * | 1/2003 | Tokuhisa et al. | 427/385.5 |

FOREIGN PATENT DOCUMENTS

| | | |
|---|---|---|
| EP | 0 967 297 A1 | 12/1999 |
| JP | 61-003474 | 1/1986 |
| JP | 62-260372 A | 11/1987 |
| JP | 63-276832 A | 11/1988 |
| JP | 6-306611 | 11/1994 |
| JP | 6-322516 | 11/1994 |
| JP | 7-213995 | 8/1995 |
| JP | 9-77509 | 3/1997 |
| JP | 10-176277 A | 6/1998 |
| JP | 10-265959 A | 10/1998 |
| JP | 11-40829 | 2/1999 |
| JP | 11-269657 A | 10/1999 |
| JP | 2000-349312 | 12/2000 |
| JP | 2001-111076 | 4/2001 |
| JP | 2001-127323 | 5/2001 |
| JP | 2001-335950 A | 12/2001 |
| JP | 2002-38093 | 2/2002 |

OTHER PUBLICATIONS

European Search Report dated Jul. 5, 2011 issued in corresponding EP Application No. EP 03 81 6458.8.
Data of the New Energy and Industrial Technology Development Organization (Jun. 7, 2002) pp. 5-6.

* cited by examiner

*Primary Examiner* — Mark Ruthkosky
*Assistant Examiner* — Ian Rummel
(74) *Attorney, Agent, or Firm* — Kenyon & Kenyon LLP

(57) ABSTRACT

An inorganic-organic hybrid film-coated stainless steel foil comprising a stainless steel foil substrate having coated on one surface or both surfaces thereof an inorganic-organic hybrid film, wherein the inorganic-organic hybrid film comprises a skeleton formed of an inorganic three-dimensional network structure mainly comprising a siloxane bond, with at least one crosslinked oxygen of the skeleton being replaced by an organic group and/or a hydrogen atom; and an inorganic-organic hybrid film-coated stainless steel foil comprising a stainless steel foil having coated thereon a plurality of inorganic-organic hybrid films each mainly comprising a siloxane bond, wherein at least a part of Si constituting each inorganic-organic hybrid film is chemically bonded to one or both of an organic group and hydrogen, provided that the uppermost layer out of the plurality of inorganic-organic hybrid films may be an inorganic $SiO_2$ film, and adjacent films of the plurality of inorganic-organic hybrid films (including the inorganic $SiO_2$ film) differ in the composition from each other.

7 Claims, No Drawings

INORGANIC—ORGANIC HYBRID-FILM-COATED STAINLESS-STEEL FOIL

This application is a divisional application under 35 U.S.C. §120 and §121 of U.S. application Ser. No. 10/550,747, filed Sep. 23, 2005 now abandoned, which is a 35 U.S.C. §371 of PCT/JP03/10087 filed Aug. 7, 2003, which claims priority to Japanese Application No. 2003-87950, filed Mar. 27, 2003, each of which is incorporated herein by reference in its entirety.

TECHNICAL FIELD

The present invention relates to a stainless steel foil coated with an inorganic-organic hybrid film produced by the sol-gel method and having a function such as an insulating property. In particular, the present invention relates to a stainless steel foil coated with an inorganic-organic hybrid film (silica-based thin film) comprising a plurality of layers.

BACKGROUND ART

An electrically insulating substrate material is used for an IC substrate, a sensor substrate, a solar cell substrate, an electrode substrate or the like, and this material is essential in the electronic and electric industry.

With the diversification of usage in the future, the electrically insulating substrate material is required to have heat resistance, hardness and strength. Furthermore, the structure of a product is complicated while reduction in the size and weight is required, and therefore, a thin material, a lightweight material and a material with good processability are demanded. A stainless steel foil coated with an insulating film is considered to be capable of responding to such needs.

A material produced by forming a resin layer on a substrate has been conventionally known but this material has a problem in the heat resistance, hardness and the strength of the resin layer. Also, a material produced by film-forming a ceramic such as $SiO_2$ or SiN on a stainless steel sheet by plasma CVD (see, Japanese Unexamined Patent Publication (Kokai) No. 6-306611) or a material produced by film-forming a ceramic such as TiN, TiC or $TiO_x$ on a stainless steel foil by ion plating (see, Japanese Unexamined Patent Publication (Kokai) No. 6-322516) have been disclosed. However, in the case where the coated film is a ceramic film, that is, an inorganic material, the flexibility is insufficient despite excellence in the heat resistance, hardness and strength and when this film is formed on a substrate having flexibility, cracking is readily generated in the ceramic film on the substrate and there not only arises a problem such as failure in maintaining the insulating property but even separation of the film, from the stainless steel foil, occurs due to stress produced at the crack-generating site.

Furthermore, a method of coating a polysilazane-containing coating solution on a resin, stainless steel or glass substrate to form a silica film on the substrate has been disclosed (see, Japanese Unexamined Patent Publication (Kokai) No. 2001-111076) but in the case of stainless steel or glass substrate, the substrate itself is poor in processability.

In addition, for example, Japanese Unexamined Patent Publication (Kokai) No. 61-003474 discloses the importance of flatness of the substrate by stating that in the case of a metal substrate for a solar cell, if an inclusion in a size of 1.0 μm or more is present, the metal substrate is short-circuited with the electrode provided as an outermost surface and this causes a fatal defect or the like in the solar cell. However, in the film-forming method using a dry process, the film deposits following the surface roughness and therefore, satisfactory flatness may not be obtained on the material surface.

Accordingly, a first object of the present invention is to solve the problems in those conventional techniques and provide a stainless steel foil coated with an inorganic-organic hybrid film excellent in the heat resistance, processability, flatness, flexibility and insulating property.

Also, along with recent reduction in the size and weight of a final product, the electrically insulating substrate material is required to be thin and lightweight and have good processability.

For example, in the production of a thin-film solar cell having flexibility, a resin such as polyimide is coated on a supporting substrate such as glass and then cured, respective layers of an amorphous solar cell are stacked thereon, and the stack is dipped in water to separate layers of the amorphous solar cell together with the resin from the supporting substrate. In the case of polyimide generally employed, if the film is formed by allowing the imidation reaction to completely proceed, the film can be hardly separated from the supporting substrate. When the film is heat-treated at a low temperature, the separation is facilitated but, as insufficient imidation results, an out-gas may be generated at the formation of an amorphous silicon and this may cause deterioration in the quality of the amorphous silicon film, an elevation of water absorptivity or a decrease in reliability. In this way, the separation type has dual problems of separability and reliability and it is required, in practice, to solve these problems.

In another type of a flexible thin-film solar cell, an organic resin coating material such as polyimide coating material having high insulating property is coated on a metal foil (see, Japanese Unexamined Patent Publication (Kokai) No. 2001-127323). However, many of organic resins deteriorate in the heat treatment at 200 to 350° C. during formation of a solar battery cell. Even in the case of an organic resin having high heat resistance such as polyimide, the thermal expansion coefficient is large as compared with an inorganic material and therefore, cracks or the like are generated in the formed solar battery cell, on cooling, and the power generation efficiency decreases. Therefore, for a silicon-based thin-film solar cell with flexibility, a metal foil coated with an insulating material having high heat resistance and a small thermal expansion coefficient is required. The insulating property is on the $M\Omega \cdot cm^2$ order in the case of a solar cell substrate or the like.

Furthermore, also in a solar cell using a compound semiconductor thin-film system known to have high power generation efficiency, realization of a large area and a low cost is required and studies are being made to form a cell on a stainless steel foil suitable for the roll-to-roll system (see, Data of The New Energy and Industrial Technology Development Organization, pp. 5-6 (Jun. 7, 2002)). For connecting in series respective unit cells by collecting solar battery cells, an insulating film is formed on a stainless foil, a lower electrode is film-formed thereon, and a semiconductor film such as Cu—In—Ga—Se is stacked. The property required, of the insulating film, is high heat resistance, because it is necessary to perform vapor deposition by elevating the substrate temperature to 500 to 600° C. at the production of a semiconductor film or apply a heat treatment at 500 to 600° C. after sputtering. A material produced by film-forming a ceramic such as $SiO_2$ or SiN on a stainless steel by plasma CVD (see, Japanese Unexamined Patent Publication (Kokai) No. 6-306611) or a material produced by film-forming a ceramic such as TIN, TiC or $TiO_x$ on a stainless steel foil by ion plating (see, Japanese Unexamined Patent Publication (Kokai) No.

6-322516) is disclosed. However, in the case where the insulating film is a ceramic film, that is, an inorganic material, the flexibility is insufficient despite excellent heat resistance and when this film is formed on a substrate having flexibility, cracking is readily generated in the ceramic film on the substrate and not only does there arise a problem such as failure in maintaining the insulating property but also separation of the film, from the stainless steel foil, occurs due to stress produced at the crack-generating site. Also, in the film-forming method such as sol-gel method, as cracking is generated when the film thickness is increased, a film thickness large enough to ensure the insulating property of $M\Omega \cdot cm^2$, required of the solar cell substrate, is not obtained in many cases. On the other hand, an insulating film of an organic resin system such as polyimide is not satisfactory in heat resistance. Furthermore, an Mo metal is usually used as the lower electrode in a compound semiconductor-based solar cell, but there is a problem that the adhesion of Mo to an organic material having a large thermal expansion coefficient is extremely poor.

Accordingly, a second object of the present invention is to provide a stainless steel foil coated with a plurality of inorganic-organic hybrid films so as to satisfy all of heat resistance, insulating property on the order of 1 $M\Omega \cdot cm^2$, and adhesion to a device layer.

DISCLOSURE OF THE INVENTION

In the present invention, the objects of the present invention are attained by the following means.

(1) An inorganic-organic hybrid film-coated stainless steel foil comprising a stainless steel foil substrate having coated on one surface or both surfaces thereof an inorganic-organic hybrid film, wherein the inorganic-organic hybrid film comprises a skeleton formed of an inorganic three-dimensional network structure mainly comprising a siloxane bond, with at least one crosslinked oxygen of the skeleton being replaced by an organic group and/or a hydrogen atom, and the ratio [H]/[Si] between hydrogen concentration [H] (mol/l) and silicon concentration [Si] (mol/l) in the film satisfies the condition of $0.1 \leq [H]/[Si] \leq 10$.

(2) The inorganic-organic hybrid film-coated stainless steel foil as described in (1) above, wherein the organic group is one or more member selected from an alkyl group, an aryl group, a hydroxyl group, a carboxyl group and an amino group.

(3) The inorganic-organic hybrid film-coated stainless steel foil as described in (1) or (2) above, wherein the average roughness Raf of the surface of the inorganic-organic hybrid film satisfies the condition of $Raf \leq 0.02$ μm.

(4) The inorganic-organic hybrid film-coated stainless steel foil as described in any one of (1) to (3) above, wherein the thickness Tf of the inorganic-organic hybrid film satisfies the condition of $0.05$ μm $\leq Tf \leq 5$ μm.

(5) The inorganic-organic hybrid film-coated stainless steel foil as described in any one of (1) to (4) above, wherein the thickness Tf of the inorganic-organic hybrid film and the thickness Ts of the stainless steel foil substrate satisfy the condition of $Tf \leq Ts/20$.

(6) The inorganic-organic hybrid film-coated stainless steel foil as described in any one of (1) to (5) above, wherein the thickness Tf of the inorganic-organic hybrid film and the average roughness Ras of the surface of the stainless steel foil substrate satisfy the condition of $Ras \leq Tf/2$.

(7) An inorganic-organic hybrid film-coated stainless steel foil comprising a stainless steel foil having coated thereon a plurality of inorganic-organic hybrid films each mainly comprising a siloxane bond, wherein at least a part of Si constituting each inorganic-organic hybrid film is chemically bonded to one or both of an organic group and hydrogen, provided that the uppermost layer out of the plurality of inorganic-organic hybrid films may be an inorganic $SiO_2$ film, and adjacent films of the plurality of inorganic-organic hybrid films (including the inorganic $SiO_2$ film) differ in the composition from each other.

(8) The inorganic-organic hybrid film-coated stainless steel foil as described in (7) above, wherein out of the plurality of inorganic-organic hybrid films, the thermal expansion coefficient of the upper inorganic-organic hybrid film is smaller than the thermal expansion coefficient of the lower inorganic-organic hybrid film.

(9) The inorganic-organic hybrid film-coated stainless steel foil as described in (7) or (8) above, wherein the uppermost film is an $SiO_2$ film.

(10) The inorganic-organic hybrid film-coated stainless steel foil as described in (7) or (8) above, wherein the uppermost inorganic-organic hybrid film is an inorganic-organic hybrid film in which at least a part of the Si constituting the film is bonded to hydrogen but is not bonded to an organic group.

(11) The inorganic-organic hybrid film-coated stainless steel foil as described in any one of (7) to (10) above, wherein the molar ratio of H/Si in the uppermost inorganic-organic hybrid film is 1.0 or less.

(12) The inorganic-organic hybrid film-coated stainless steel foil as described in any one of (7) to (11) above, wherein the uppermost inorganic-organic hybrid film has a thickness of 0.5 μm or less.

(13) The inorganic-organic hybrid film-coated stainless steel foil as described in any one of (7) to (12) above, wherein out of the plurality of inorganic-organic hybrid films, the lowermost inorganic-organic hybrid film is an inorganic-organic hybrid film in which at least a part of Si constituting the film is bonded to an alkyl group having a carbon number of 1 to 4.

(14) The inorganic-organic hybrid film-coated stainless steel foil as described in (13) above, wherein the alkyl group is a methyl group.

(15) The inorganic-organic hybrid film-coated stainless steel foil as described in (14) above, wherein the molar ratio of methyl group/Si in the lowermost inorganic-organic hybrid film is from 0.2 to 1.0.

(16) The inorganic-organic hybrid film-coated stainless steel foil as described in any one of (7) to (15) above, wherein the lowermost inorganic-organic hybrid film has a thickness of 0.5 to 5 μm.

(17) The inorganic-organic hybrid film-coated stainless steel foil as described in any one of (7) to (16) above, which further comprises an inorganic-organic hybrid film having a medium thermal expansion coefficient between the uppermost inorganic-organic hybrid film having a small thermal expansion coefficient and the lowermost inorganic-organic hybrid film having a large thermal expansion coefficient.

MODE FOR CARRYING OUT THE INVENTION

In a first aspect, the present invention provides an inorganic-organic hybrid film-coated stainless steel and, in a second aspect, the present invention provides particularly a stainless steel foil coated with a plurality of inorganic-organic hybrid films, which is satisfied in all of heat resistance, insulating property on the order of 1 $M\Omega \cdot cm^2$, and adhesion to a device layer.

The first aspect of the present invention has been accomplished based on the finding that when an inorganic-organic hybrid film containing an appropriate amount of an organic group produced by using the sol-gel method is coated on one surface or both surfaces of a stainless steel foil substrate, a stainless steel foil excellent in the heat resistance, processability, flatness, insulating property and the like can be obtained.

The stainless steel foil substrate for use in the present invention may be sufficient if it is industrially produced and has a thickness Ts of 100 μm or less, but the thickness is preferably from 10 to 100 μm, more preferably from 20 to 100 μm. If the thickness Ts of the foil exceeds 100 μm, flexibility as a foil cannot be expected and at the same time, a characteristic merit of the foil, that is, reduction in the weight, is lost. On the other hand, a stainless steel foil substrate having a thickness Ts of less than 10 μm is very prone to a so-called broken surface at handling and is hard to adapt to an industrial process and moreover, the strength as a substrate decreases to cause a problem in reliability during use. Furthermore, such a thin stainless steel foil substrate is intrinsically expensive from the industrial standpoint.

The thickness Ts of the stainless steel foil substrate for use in the present invention can be measured by using a contact system micrometer.

The macroscopic flatness of the stainless steel foil substrate for use in the present invention, that is, how large a gap is created between a flat surface and a foil when the foil is spread on the flat surface, is not particularly limited and may be sufficient if it does not disturb uniform coating of a sol and furthermore, does not cause any trouble when the inorganic-organic hybrid film-coated stainless steel foil of the present invention is used as a substrate or the like.

The surface of the stainless steel foil substrate for use in the present invention is coated with a so-called natural oxide film which is produced at room temperature in air and is an ultrathin film, and need not be subjected to a chemical treatment, but for a special purpose of, for example, effecting surface oxidation or imparting interference color or special asperities, surface modification may be applied to the surface of the stainless steel foil substrate. However, such surface modification should ensure, on coating a sol, satisfactory wettability to the sol which is a liquid, and should not cause a problem in the adhesion between the inorganic-organic hybrid coat and the stainless steel foil surface.

The inorganic-organic hybrid coat for use in the present invention must be formed of a silica-based inorganic-organic hybrid material. The silica-based film is advantageous in that the raw material is inexpensive and a film having high insulating property is easily obtained. The inorganic-organic hybrid material is a material having an inorganic skeleton in which the main skeleton comprises a siloxane bond developed like a three-dimensional network structure and in which at least one crosslinked oxygen of the skeleton is replaced by an organic group and/or a hydrogen atom.

The characteristic features of the inorganic-organic hybrid coat of the present invention vary depending on the ratio between the concentration [H] (mol/l) of hydrogen atom and the concentration [Si] (mol/l) of silicon atom contained in the film. [H] derives from the organic group bonded to the Si atom and [Si] derives from the Si atom in the silica skeleton which is an inorganic component. Accordingly, by controlling the ratio [H]/[Si] between [H] (mol/l) and [Si] (mol/l), the characteristic features of the coat can be controlled. The value of [H]/[Si] can be measured by chemical analysis or instrumental analysis such as X-ray photoelectron spectroscopy (XPS).

The ratio [H]/[Si] of the hydrogen concentration [H] (mol/l) to silicon concentration [Si] (mol/l) must be $0.1 \leq [H]/[Si] \leq 10$. When $0.1 \leq [H]/[Si] \leq 10$, cracking resistance, high hardness, heat resistance, adhesion and insulating property are obtained by virtue of good flexibility even for a substrate requiring high-grade processability, such as stainless steel foil. If $0.1 > [H]/[Si]$, sufficiently high cracking resistance and insulating property cannot be ensured. The reason why the insulating property cannot be ensured is because a large number of microcracks are produced during film formation. On the other hand, if $[H]/[Si] > 10$, a sufficiently high heat resistance and hardness cannot be ensured. The ratio is preferably $0.3 \leq [H]/[Si] \leq 3$.

The reason why the characteristic features of the film vary depending on the value of [H]/[Si] is not clearly known, but it is presumed that, although the organic group or hydrogen atom has an activity of imparting flexibility or cracking resistance, if the ratio thereof is too high, the silica skeleton, which is an inorganic component and is thought to impart heat resistance or chemical stability to the hybrid film, is insufficiently formed and therefore, satisfactory performance as the coated film of a stainless steel foil can be exerted only in a limited range.

In the inorganic-organic hybrid coat of the present invention, the organic group modifying the siloxane skeleton is preferably one member or multiple members selected from an alkyl group, an aryl group, a hydroxyl group, a carboxyl group and an amino group. More preferred examples of the organic group modifying the siloxane skeleton include an alkyl group having a carbon number of 1 to 5 or a substitution product thereof, and an aryl group having a carbon number of 6 to 10 or a substitution product thereof. The aryl group may be a heterocyclic ring containing N, S or O but, in particular, when the aryl group is a phenyl group or a substitution product thereof, an inorganic-organic hybrid coat having both high heat resistance and high film strength can be obtained. However, if the organic group modifying the siloxane skeleton is a vinyl or epoxy group capable of organic polymerization, an organic skeleton is also formed in addition to the inorganic siloxane skeleton and therefore, the heat resistance decreases.

In the inorganic-organic hybrid coat of the present invention, insofar as the excellent performance of the inorganic-organic hybrid film-coated stainless steel foil is not impaired, impurities may be contained or a compound for the purpose of controlling the reaction at the film formation may be added. Furthermore, an alkoxide and/or organometallic alkoxide of one or more metal element or semimetal element M selected from B, Al, Ge, Ti, Y, Zr, Nb, Ta and the like may be contained.

In the present invention, the average roughness Raf on the surface of the inorganic-organic hybrid coat preferably satisfies the condition of $Raf \leq 0.02$ μm. Within this range, patterning of 1 μm or less, namely, stacking with good precision of a metal or semiconductor film to a thickness of 1 μm or less on the inorganic-organic hybrid film-coated stainless steel foil of the present invention, can be realized. The Raf is more preferably $Raf \leq 0.01$ μm.

The thickness Tf of the inorganic-organic hybrid coat of the present invention preferably satisfies the condition of $0.05$ μm $\leq Tf \leq 5$ μm. Under this condition, the inorganic-organic hybrid coat can be uniformly coated on the stainless steel foil substrate with ease, there arises no problem in the cracking resistance and insulating property and, furthermore, the macroscopic flatness of the stainless steel foil substrate is not impaired. If Tf is less than 0.05 μm, the inorganic-organic hybrid coat may not be uniformly coated on the stainless steel foil substrate and at the same time, the insulating property of the coat decreases. If Tf exceeds 5 μm, cracks are readily produced in the coat. The Tf is more preferably 0.5 μm≤Tf≤2 μm.

The thickness Tf of the inorganic-organic hybrid coat of the present invention can be measured as follows. The inorganic-organic hybrid film coated stainless steel foil of the present invention is embedded in an epoxy resin and then flaked by using mechanical polishing and converged ion beam, and the cross section thereof is observed by a transmission electron microscope (TEM) or a scanning electron microscope (SEM). The thickness may also be determined by the spherical polishing method or the like.

The thickness Tf of the inorganic-organic hybrid coat of the present invention and the thickness Ts of the stainless steel foil substrate preferably satisfy the condition of Tf≤Ts20. If Tf>Ts/20, the macroscopic flatness of the stainless steel foil is impaired. This is considered to occur because the stainless steel foil substrate is not sufficiently thick for the thickness of the coat and cannot withstand the stress generated when the film is going to shrink during the film formation and, as a result, deformation occurs. The Tf is more preferably Tf≤Ts/40.

The average roughness Ras on the surface of the stainless steel foil substrate for use in the present invention preferably satisfies the condition of Ras≤Tf/2, more preferably Ras≤Tf/10, with respect to the thickness Tf of the inorganic-organic hybrid coat. The inorganic-organic hybrid coat of the present invention is formed by the sol-gel method and therefore, when the condition of Ras≤Tf/2 is satisfied, the average roughness Raf on the surface of the inorganic-organic hybrid coat becomes very small. Furthermore, when the condition of Ras≤Tf/10 is satisfied, the uniformity in the thickness of the inorganic-organic hybrid coat is more elevated and therefore, in the case of using the inorganic-organic hybrid film-coated stainless steel foil of the present invention as a substrate, the reliability of the insulating property is elevated. The Ras is more preferably Ras≤Tf/20.

The average roughness Ras on the surface of the stainless steel foil substrate of the present invention and the average roughness Raf on the surface of the inorganic-organic hybrid coat of the present invention each may be measured by using an ordinary mechanical contact-type roughness meter, an atomic force microscope (AFM) or a laser microscope, but a method most suitable for the surface roughness should be used. For example, when the surface is very smooth, a laser microscope or AFM should be used, because the ordinary mechanical contact-type roughness meter is low in precision.

The inorganic-organic hybrid film-coated stainless steel foil of the present invention can be produced as follows. A sol is prepared so that the ratio between the hydrogen concentration [H] (mol/l) and the silicon concentration [Si] (mol/l) in the coat obtained after the final baking step can be 0.1≤[H]/[Si]≤10. Thereafter, the sol prepared is coated on a stainless steel foil substrate and then dried. After the drying, the coat is baked, whereby an inorganic-organic hybrid film-coated stainless steel foil can be produced.

The above-described sol is prepared as follows. A starting material comprising sole organoalkoxysilane, two or more organoalkoxysilanes, or a mixture of sole organoalkoxysilane or two or more organoalkoxysilanes with sole alkoxysilane or two or more alkoxysilanes is diluted with an organic solvent and, while stirring the dilute solution, an aqueous acetic acid solution is added to effect hydrolysis, whereby the sol is obtained. The organoalkoxysilane is represented by the formula: $R_nSi(OR')_{4-n}$ (wherein R and R' each is a hydrogen atom and/or an organic group, and n is selected from the integers from 1 to 3). The —OR' group is hydrolyzed and therefore, R' scarcely remains in the inorganic-organic hybrid coat after baking, but R directly bonded to Si is immune to hydrolysis and remains as-is in the inorganic-organic hybrid coat after baking. The alkoxysilane is represented by the formula: $Si(OR'')_4$ (wherein R" is a hydrogen atom and/or an organic group. The —OR" group is hydrolyzed and therefore, R" scarcely remains in the inorganic-organic hybrid coat after baking. Accordingly, the starting material of the sol is prepared such that the ratio [H]/[Si] between the total molar number [H] of H in R of the organoalkoxysilane (formula: $R_nSi(OR')_{4-n}$) and the total molar number [Si] of Si in the starting material becomes from 0.1 to 10.

Examples of R which is an organic group or a hydrogen atom in the organoalkoxysilane (formula: $R_nSi(OR')_{4-n}$) used as the starting material for the preparation of the sol include hydrogen, an alkyl group having a carbon number of 1 to 5 or a substitution product thereof, an aryl group having a carbon number of 6 to 10 or a substitution product thereof, and a carboxyl group. The aryl group may be a heterocyclic ring containing N, O or S. In the organoalkoxysilane (formula: $R_nSi(OR')_{4-n}$) when n is 2 or 3, R may be the same or different and examples of R' include an alkyl group having a carbon number of 1 to 6. Also, when n is 1 or less, R' may be the same or different.

Suitable examples of the organoalkoxysilane include methyltrimethoxysilane, methyltriethoxysilane, ethyltrimethoxysilane, ethyltriethoxysilane, propyltrimethoxysilane, propyltriethoxysilane, isobutyltrimethoxysilane, isobutyltriethoxysilane, dimethoxymethyl-3,3,3-trifluoropropylsilane, diisobutyldimethoxysilane, trimethylmethoxysilane, dimethoxydimethylsilane, diethoxydimethylsilane, phenyltriethoxysilane, methacryloxypropyltrimethoxysilane, methacryloxypropyltriethoxysilane, aminopropyltriethoxysilane and aminoethylaminopropyltriethoxysilane. One of these organoalkoxysilanes or a mixture of two or more thereof is suitably used as the starting material for the preparation of the sol.

Examples of the alkoxysilane (formula: $Si(OR'')_4$) which is added as the starting material at the preparation of the sol include tetramethoxysilane, tetraethoxysilane and tetrapropoxysilane.

In the raw material of the inorganic-organic hybrid coat for use in the present invention, insofar as the excellent performance of the inorganic-organic hybrid film-coated stainless steel foil is not impaired, impurities may be contained or a compound for the purpose of controlling the reaction at the film formation may be added. Furthermore, in the starting material for the preparation of the sol, an alkoxide and/or organometalo alkoxide of one or more metal elements or semimetal elements M selected from B, Al, Ge, Ti, Y, Zr, Nb, Ta and the like may be contained for the purpose of controlling the hydrolysis.dehydrating condensation reaction. Such an alkoxide and/or organoalkoxide generally produces a hydrolysate having high reactivity as compared with the organoalkoxide or alkoxide of silicon and therefore, the film formation can be performed at a lower temperature in a shorter time. Furthermore, the amount of the SiOH group in the film, which is an unreacted moiety of dehydrating condensation, decreases, so that the insulating property of the film can be enhanced.

The inorganic skeleton in the inorganic-organic hybrid coat may contain an M-O-M bond or M-O—Si bond comprising the above-described metal element or semimetal element M except for Si and an oxygen atom. The total molar amount of this metal element or semimetal element M except for Si in the coat must be 25% or less based on the molar amount of Si in the coat so as not to impair the excellent performance of the inorganic-organic hybrid film-coated stainless steel foil of the present invention. Also, for a purpose other than that of the present invention, an inorganic film or organic film may be further stacked on the stainless steel foil.

As for the organic solvent used in the preparation of the sol, organic solvents selected from various alcohols (e.g., methanol, ethanol, propanol, butanol), acetone, toluene, xylene and the like are suitably used individually or in combination. The organic solvent is used such that the ratio of the total molar number of organoalkoxysilane or the total molar number of organoalkoxysilane and alkoxysilane to the total molar number of the organic solvent becomes about 1:1.

An aqueous acetic solution is suitably added as the catalyst of hydrolysis. The aqueous acetic acid solution is added in an amount such that the molar number of water becomes from 1 to 2 times the molar number of all alkoxy groups and the molar number of acetic acid becomes from 0.001 to 0.1 times the molar number of all alkoxy groups. When heat is generated during the dropwise addition of the aqueous acetic acid solution, the solution is added dropwise slowly or under cooling. Incidentally, if water in an amount of more than 2 times the molar number of all alkoxy groups is added, the coating solution for use in the film formation comes to have a significantly short lifetime and undergoes gelling during storage and this is not preferred. Also, hydrochloric acid, phosphoric acid or the like can be suitably used instead of acetic acid.

The prepared sol for the formation of the inorganic-organic hybrid coat may be diluted with a sole or mixed organic solvent selected from various alcohols (e.g., methanol, ethanol, propanol, butanol), acetone, toluene, xylene and the like or with water according to the required film thickness or the like. On the contrary, the alcohol or the like used as the solvent or produced during hydrolysis may be removed by distillation under atmospheric pressure or reduced pressure after the hydrolysis. This preparation is usually performed so that the film obtained by one-time coating can have a thickness of approximately from 0.05 to 5 µm. The dilution with water is preferably performed immediately before coating so as to prevent gelling of the coating solution during storage.

The coating on the substrate is performed by a known method such as bar coating, roll coating, spray coating, dip coating and spin coating. When the average roughness Ras on the surface of the stainless steel foil substrate and the thickness Tf of the inorganic-organic hybrid film satisfy both 0.05 µm≤Tf≤5 µm and Ras≤Tf/2, preferably Ras≤Tf/10, the surface thereof becomes very smooth by the effect of surface tension of the sol and the average roughness Raf on the surface of the inorganic-organic hybrid film after baking becomes 0.02 µm or less.

After the coating, the coat is dried at 100 to 150° C. for 5 to 10 minutes and then baked. The baking may be performed at a temperature of 200 to 600° C., preferably from 300 to 500° C., in nitrogen or air or in an inert gas such as Ar for approximately from 5 minutes to 2 hours. By this heat treatment, the dehydrating condensation reaction is accelerated and an inorganic-organic hybrid coat is formed. In the baking step, the temperature rising rate is preferably made as small as possible. If the temperature rising rate is 200° C./rain or more, the dehydrating condensation reaction abruptly occurs and a problem may arise in the soundness of the coat and, particularly, flatness on the film surface, or cracks may be generated. The baking temperature is set according to the type of the organic group in the organoalkoxide. If the baking temperature exceeds 600° C., the dehydrating condensation reaction satisfactorily proceeds even if the baking time is short, but depending on the type of the organic group, thermal decomposition or oxidation may occur to impair the soundness of the coat. On the other hand, if the baking temperature is less than 200° C., a very long treatment time is necessary for achieving satisfactory progress of the dehydrating condensation reaction and this is not preferred from the industrial standpoint.

The second aspect of the present invention is described below.

The inorganic polymer is a polymer where the main skeleton is constituted by an inorganic bond of M (metal or semimetal)-O (oxygen)-M. In particular, when M is Si, this is called a siloxane bond. When all Ms are Si and the Si is constituting a tetrahedral unit of 4-coordinate $SiO_4$, the inorganic polymer becomes an $SiO_2$ glass.

However, Si can be chemically bonded, similarly to C, directly to an organic group or H (hydrogen) like Si—$CH_3$, Si—$C_6H_5$ or Si—H. In the case where the siloxane bond is formed by Si in which out of four bonds of Si, only one bond forms an Si—R (R is an organic group or H) bond and the remaining three bonds are Si—O, this inorganic polymer is called silsesquioxane. In the case where out of four bonds of Si, two bonds form an Si—R bond and the remaining two bonds are Si—O, this is a linear polymer as seen in silicone oil or the like.

In the second aspect of the present invention, in a part or the entirety of the inorganic polymer, out of four bonds of Si, one or two bond(s) of Si may be forming an Si—R bond. Such a polymer where a part or the entirety of Si constituting the inorganic polymer is bonded to hydrogen and/or an organic group is called an inorganic-organic hybrid similarly to the first aspect of the present invention, even though hydrogen is not an organic group.

The inorganic polymer or inorganic-organic hybrid of the present invention may contain an M-O bond other than the siloxane bond, and examples of M include B, Al, Ti, Zr, Nb, Ta, W and P. The ratio of the M-O bond to the sum of the Si—O bond and the M-O bond is preferably 10% or less. The component except for Si, such as B, Al, Ti, Zr, Nb, Ta, W and P, has an effect of accelerating the production of Si—O bond. However, when the ratio exceeds 10%, fine particles of hydroxide or oxide of M itself may form an aggregate. The composition of the inorganic polymer or inorganic-organic hybrid may comprise a combination of components arbitrarily selected according to the purpose.

In use as a substrate of a solar cell or the like, the insulating property and the adhesion to a device layer are required. The composition for the uppermost inorganic-organic hybrid or inorganic polymer film is preferably selected to ensure excellent adhesion to a device layer stacked thereon. For this purpose, it is important to approximate the thermal expansion coefficients of the uppermost inorganic-organic hybrid or inorganic polymer film and the device layer. The device layer generally has an inorganic semiconductor composition and therefore, the organic group contained in the inorganic-organic hybrid film is preferably decreased as much as possible to bring the composition close to $SiO_2$, or hydrogen is preferably selected as the component to which Si is chemically bonded. In the uppermost inorganic polymer or inorganic-organic hybrid layer adjusted to have such a composition, the thermal expansion coefficient becomes small, but the film is hard and cracks are readily generated at the curing of polymer. Therefore, only a film thickness of less than 0.5 µm can be obtained. In general, even when the average surface roughness is 0.1 µm or less, a stainless steel foil, locally, has vigorous asperities ascribable to the inclusion of the base material and if the thickness is less than 0.5 µm, the local protrusions cannot be covered and the insulating property cannot be ensured. Accordingly, a sufficiently high insulating property cannot be obtained only with one layer of a film in which the organic group contained in the inorganic-organic hybrid film is decreased as much as possible to bring the composition close to $SiO_2$, an $SiO_2$ film itself or a film where hydrogen is selected as the component to which Si is chemically bonded.

In the case where the uppermost inorganic-organic hybrid polymer is a polymer in which a part or the entirety of Si constituting the polymer is bonded to H, the molar ratio of H to Si is preferably 1.0 or less. If this ratio exceeds 1.0, the uppermost film is soft and prone to defects such as flaws and this is not preferred. When this ratio is 0, the film is an $SiO_2$ film.

In order to ensure the insulating property, it is effective to select a composition facilitating the film thickening for the lowermost inorganic-organic hybrid film. The film thickness is preferably from 0.5 to 5 µm. If the film thickness is less than 0.5 µm, as described above, local protrusions of the substrate cannot be covered and insulation cannot be ensured, whereas if the film thickness exceeds 5 µm, great volume shrinkage occurs at the curing of polymer and this causes ready generation of cracks in the inorganic-organic hybrid film. Examples of the composition facilitating the film thickening include a composition where R chemically bonded to Si is a bulky alkyl group and the molar ratio of R to Si is high. As the polymer film comprising such a composition has a large amount of organic components, the thermal expansion coefficient becomes high and a large difference in the thermal expansion coefficient is generated between the polymer film and a device layer stacked thereon. As a result, cracking is induced in the device layer during the production process and the yield decreases. Therefore, an uppermost film comprising a composition ensuring good adhesion to a device layer and a lowermost film facilitating the film thickening are combined, whereby both adhesion to the device layer and insulating property can be satisfied.

Also, a third layer having a medium thermal expansion coefficient between those of the uppermost layer and the lowermost layer may be interposed between the uppermost layer and the lowermost layer so as to enhance the adhesion. The film thickness of the third layer is preferably from 0.2 to 5.0 µm. If the film thickness is less than 0.2 µm, the effect of improving the adhesion by interposing the third layer is not obtained, whereas if it exceeds 5.0 µm, cracking readily occurs due to volume shrinkage at the formation of polymer film. Furthermore, a fourth layer and a fifth layer may also be inserted, but the film thickness as a whole is preferably 10 µm or less. If the film thickness exceeds 10 µm, the outgassing component from the polymer layer increases and this may adversely affect the device layer.

In particular, when at least a part of Si constituting the polymer is bonded to an alkyl group having a carbon number of 1 to 4, the lower inorganic-organic hybrid film can be formed as a film satisfying both the heat resistance and the thick film. In the case of an alkyl group having a carbon number exceeding 4, the heat resistance significantly decreases and since thermal decomposition occurs even in a heat treatment at about 200° C. during formation of a silicon-based solar battery cell, the usage is limited to, for example, a device produced by a low-temperature process at a temperature of less than 200° C. Also in the case of an organic group other than the alkyl group, film formation satisfying both the heat resistance and the thick film can hardly be attained. For example, in the case of a phenyl group, film thickening is difficult due to rigid structure, despite high heat resistance. In the case of an epoxy group, film thickening may be attained but heat resistance of 200° C. cannot be obtained. In particular, the alkyl group having a carbon number of 1 to 4 is preferably a methyl group, because heat resistance of 400 to 600° C. or more can be obtained. The molar ratio of methyl group/Si is preferably from 0.2 to 1.0. If this ratio is less than 0.2, the inorganic-organic hybrid film becomes hard and therefore, a film thickness large enough to ensure the insulating property cannot be obtained, whereas if this ratio exceeds 1.0, a soft film results and it is difficult to form an upper film without scratching the lowermost film.

The inorganic-organic hybrid film-coated stainless steel foil of the present invention can be produced by coating and stacking a plurality of sols prepared through hydrolysis starting from an organoalkoxysilane, a tetraalkoxysilane or a trialkoxysilane. The fundamental production process of the inorganic-organic hybrid film is the same as that described with respect to the first aspect of the present invention and is not described in detail here, but this is briefly described below.

Examples of the organoalkoxysilane include methyltrimethoxysilane, methyltriethoxysilane, ethyltrimethoxysilane, ethyltriethoxysilane, propyltrimethoxysilane, propyltriethoxysilane, isobutyltrimethoxysilane, isobutyltriethoxysilane, dimethoxydimethylsilane, diethoxydimethylsilane, phenyltrimethoxysilane, phenyltriethoxysilane, methacryloxypropyltrimethoxysilane, methacryloxypropyltriethoxysilane, glycidoxypropyltrimethoxysilane, glycidoxypropyltriethoxysilane, aminopropyltrimethoxysilane and aminopropyltriethoxysilane. Examples of the tetraalkoxysilane include tetramethoxysilane and tetraethoxysilane. Examples of the trialkoxysilane include trimethoxysilane and triethoxysilane. One of these or two or more thereof is(are) selected and used as the starting material in the preparation of the sol.

The sol can be prepared by performing hydrolysis in an organic solvent in which the starting material working out to a solute can be uniformly dispersed or dissolved. Examples of the organic solvent which can be used include various alcohols (e.g., methanol, ethanol, propanol, butanol), acetone, toluene and xylene. After hydrolysis, the alcohol or the like used as the solvent or produced during hydrolysis may be removed by distillation under atmospheric pressure or reduced pressure, and then the sol may be coated. The prepared sol may be used after diluting it with an organic solvent or water according to the required film thickness or the like. This dilution is usually performed so that the film obtained by one-time coating can have a thickness of approximately from 0.2 to 2 µm.

The hydrolysis is performed by adding water in an amount of 0.5 to 2 times the molar number of all alkoxy groups in the starting material. If desired, an acid may be added as the catalyst of hydrolysis. As for the acid, either an inorganic acid or an organic acid can be used. Furthermore, an alkoxide of B, Al, Ti, Zr, Nb, Ta, W, P or the like may also be used as the hydrolysis catalyst for the alkoxide of Si. As the metal alkoxides of Al, Ti, Zr, Nb, Ta and W all have a high reactivity as compare with alkoxysilane, it is also possible to use an alkoxide derivative where a part of the alkoxy groups is replaced by a β-diketone, a β-ketoester, an alkanolamine, an alkylalkanolamine, an organic acid or the like. In the prepared sol, a silicon oil such as polydimethylsiloxane, or an inorganic particle can be added.

The sol can be coated on a stainless steel foil, for example, by a bar coating method, a roll coating method, a spray coating method, a dip coating method or a spin coating method. In particular, when the stainless steel foil has a coil shape, the sol is preferably coated by a roll coater in an offset or gravure system, because a continuous processing is facilitated. The drying after coating is preferably performed at a sheet temperature of 100 to 250° C. for 0.5 to 3 minutes. The second layer is preferably film-formed after the drying treatment of the lowermost film. The drying after coating of the second layer is also preferably performed at a sheet temperature of 100 to 250° C. for 0.5 to 3 minutes. In the case of coating and stacking three or more layers, this process is repeated. Good adhesion can be obtained even if pretreatment is not particularly applied to the stainless steel foil but, if desired, a pretreatment may be performed. Representative examples of the pretreatment include chemical conversion by acid pickling, alkali degreasing, chromate or the like, grinding, polishing and blasting. These treatments are performed individually or in combination, if desired.

Examples of the stainless steel foil material include a ferrite-based stainless steel foil, a martensite-based stainless steel foil and an austenite-based stainless steel foil. The thickness of the stainless steel foil is from 100 to 10 μm. The surface of the stainless steel foil may be previously subjected to a surface treatment such as bright annealing and buff polishing.

EXAMPLES

The present invention is described in greater detail below by referring to Examples. These Examples are given for the purpose of describing the present invention more clearly but in no way limit the present invention.

As for the cracking resistance, an inorganic-organic hybrid film-coated stainless steel foil was strained at 1% and then observed by SEM, and the cracking resistance was evaluated by the presence or absence of generation of cracks on the film surface.

As for the hardness, an inorganic-organic hybrid film-coated stainless steel foil to be evaluated was fixed on a quartz plate, and the hardness was evaluated by the pencil hardness. The hardness of 4H or more was judged as high hardness.

As for the heat resistance, an inorganic-organic hybrid film-coated stainless steel foil was heat-treated at 500° C. in vacuum and then observed by SEM, and the heat resistance was confirmed by whether the smoothness on the film surface was maintained and additionally by the presence or absence of cracks in the film.

The adhesion was evaluated by performing the crosscut adhesion test specified in JIS. The inorganic-organic hybrid film-coated stainless steel foil fixed on a quartz plate was scratched with a cutter knife to form a pattern of 100 squares of 1 mm×1 mm (the cutter knife blade penetrated the film to reach the stainless steel foil substrate but did not penetrate the stainless steel foil substrate), an adhesive tape was attached to the scratched portions and then peeled off and, if the number of squares remaining unstripped out of 100 squares was N (100), N (100)≥90 was judged as high adhesion.

As for the insulating property, Au was coated to a size of 1 cm×1 cm×10 nm or less (thickness) to form a voltage terminal at certain distant 5 portions on the surface of an inorganic-organic hybrid film-coated stainless steel foil, a voltage of 10 V/μm×Tf (μm) was applied to each voltage terminal in the thickness direction of the coat by using the stainless steel substrate as the earth and, if the common voltage on the coat was V and the sum total of the currents flowing to voltage terminals was I (A), the insulating property was evaluated by the value of R (1 cm$^2$)=5×V/I, that is, the resistance value per 1 cm$^2$. When R (1 cm$^2$)≤1×10$^6$Ω or more, the insulating property was judged as high. Incidentally, Tf is a film thickness (μm) of the inorganic-organic hybrid coat measured by the above-described method.

Example 1

A mixture of 10 mol of methyltriethoxysilane and 10 mol of tetraethoxysilane was used as the starting material for the preparation of a sol. After adding 20 mol of ethanol thereto, the mixture was thoroughly stirred. Thereafter, while stirring, an aqueous acetic acid solution prepared by mixing 2 mol of acetic acid and 100 mol of water was added dropwise to effect hydrolysis. To the thus-prepared sol, 100 mol of ethanol was added to obtain a final sol.

The obtained sol was coated by a dip coating method on both surfaces of a stainless steel foil having a size of 10 cm×10 cm, a thickness Ts of 70 μm and an average surface roughness Ras of 0.1 μm. However, about 1 cm in the upper portion of the stainless steel foil was not coated with the sol and used as a gripping portion for pulling out the foil. The pull-out rate was 0.6 mm/sec. After the coating, the sol was dried at 100° C. for 1 minute in air and then baked at 400° C. for 30 minutes in nitrogen by elevating the temperature from room temperature to 400° C. at a temperature rising rate of 10° C./min, whereby an inorganic-organic hybrid film-coated stainless steel foil of the present invention was obtained.

The thickness Tf of the thus-obtained inorganic-organic hybrid coat was 0.6 μm. The average roughness Raf on the surface of this coat was as small as 0.015 μm, revealing that the inorganic-organic hybrid coat has small surface roughness. The ratio [H]/[Si] between hydrogen concentration [H] (mol/l) and silicon concentration [Si] (mol/l) in this coat was 1.7. The electric resistance value R (1 cm$^2$) in the region of 1 cm$^2$ of the coat was 4.1×10$^7$Ω and this reveals that the insulating property is high. The pencil hardness of this coat was 7H, revealing high hardness. Also, after a tensile strain of 1% was given to this inorganic-organic hybrid film-coated stainless steel foil and then the foil was restored, the coat surface was observed by SEM. As a result, cracks were not observed, revealing that this coat has high cracking resistance. Furthermore, after the inorganic-organic hybrid film-coated stainless steel foil was heat-treated at 500° C. for 1 hour in vacuum and returned to room temperature, the coat surface was observed by SEM. As a result, cracks were not observed and also no particular change was observed in the flatness of the coat surface, revealing that this coat has excellent heat resistance. With respect to the adhesion, N (100) was 100 in the crosscut adhesion test and this reveals that the adhesion between the inorganic-organic hybrid coat and the stainless steel foil substrate is high.

Example 2

A mixture of 1 mol of methyltriethoxysilane and 19 mol of tetraethoxysilane was used as the starting material for the preparation of a sol. After adding 20 mol of ethanol thereto, the mixture was thoroughly stirred. Thereafter, while stirring, an aqueous acetic acid solution prepared by mixing 2 mol of acetic acid and 130 mol of water was added dropwise to effect hydrolysis. To the thus-prepared sol, 400 mol of ethanol was added to obtain a final sol.

The sol obtained was coated by using a bar coater on one surface of a stainless steel foil having a size of 10 cm×10 cm, a thickness Ts of 20 μm and an average surface roughness Ras of 0.08 μm. However, about 1 cm in the upper portion of the stainless steel foil was not coated with the sol and used as a fixing portion for fixing the stainless steel foil. After the coating, the sol was dried at 100° C. for 1 minute in air and then baked at 450° C. for 10 minutes in nitrogen by elevating the temperature from room temperature to 450° C. at a temperature rising rate of 10° C./min, whereby an inorganic-organic hybrid film-coated stainless steel foil of the present invention was obtained.

The thickness Tf of the thus-obtained inorganic-organic hybrid coat was 0.3 µm. The average roughness Ref on the surface of this coat was as small as 0.009 µm, revealing that the coat has small surface roughness. The ratio [H]/[Si] between hydrogen concentration [H] (mol/l) and silicon concentration [Si] (mol/l) in this coat was 0.16. The electric resistance value R (1 $cm^2$) in the region of 1 $cm^2$ of the coat was $7.6 \times 10^6 \Omega$ and this reveals that the insulating property is high. The pencil hardness of this coat was 8H, revealing a high hardness. Also, after a tensile strain of 1% was given to this inorganic-organic hybrid film-coated stainless steel foil and then the foil was restored, the coat surface was observed by SEM. As a result, cracks were not observed, revealing that this coat has high cracking resistance. Furthermore, after the inorganic-organic hybrid film-coated stainless steel foil was heat-treated at 500° C. for 1 hour in vacuum and returned to room temperature, the coat surface was observed by SEM. As a result, cracks were not observed and also no particular change was observed in the flatness of the coat surface, revealing that this coat has excellent heat resistance. With respect to the adhesion, N (100) was 100 in the crosscut adhesion test and this reveals that the adhesion between the inorganic-organic hybrid coat and the stainless steel foil substrate is high.

Example 3

A mixture of 19 mol of methyltriethoxysilane and 1 mol of tetraethoxysilane was used as the starting material for the preparation of a sol. After adding 20 mol of ethanol thereto, the mixture was thoroughly stirred. Thereafter, while stirring, an aqueous acetic acid solution prepared by mixing 2 mol of acetic acid and 80 mol of water was added dropwise to effect hydrolysis. To the thus-prepared sol, 150 mol of ethanol was added to obtain a final sol.

In the same manner as in Example 1, the sol obtained was coated by a dip coating method on a stainless steel foil having a size of 10 cm×10 cm, a thickness Ts of 70 µm and an average surface roughness Ras of 0.1 µm, then dried and baked to obtain an inorganic-organic hybrid film-coated stainless steel foil of the present invention.

The thickness Tf of the thus-obtained inorganic-organic hybrid coat was 0.6 µm. The average roughness Raf on the surface of this coat was as small as 0.010 µm, revealing that the coat has small surface roughness. The ratio [H]/[Si] between hydrogen concentration [H] (mol/l) and silicon concentration [Si] (mol/l) in this coat was 3.0. The electric resistance value R (1 $cm^2$) in the region of 1 $cm^2$ of the coat was $3.3 \times 10^7 \Omega$ and this reveals that the insulating property is high. The pencil hardness of this coat was 6H, revealing high hardness. Also, after a tensile strain of 1% was given to this inorganic-organic hybrid film-coated stainless steel foil and then the foil was restored, the coat surface was observed by SEM. As a result, cracks were not observed, revealing that this coat has high cracking resistance. Furthermore, after the inorganic-organic hybrid film-coated stainless steel foil was heat-treated at 500° C. for 1 hour in vacuum and returned to room temperature, the coat surface was observed by SEM. As a result, cracks were not observed and also no particular change was observed in the flatness of the coat surface, revealing that this coat has excellent heat resistance. With respect to the adhesion, N (100) was 100 in the crosscut adhesion test and this reveals that the adhesion between the inorganic-organic hybrid coat and the stainless steel foil substrate is high.

Example 4

A mixture of 10 mol of dimethoxydimethylsilane and 10 mol of tetraethoxysilane was used as the starting material for the preparation of a sol. After adding 20 mol of ethanol thereto, the mixture was thoroughly stirred. Thereafter, while stirring, an aqueous acetic acid solution prepared by mixing 2 mol of acetic acid and 100 mol of water was added dropwise to effect hydrolysis. To the thus-prepared sol, 200 mol of ethanol was added to obtain a final sol.

In the same manner as in Example 1, the sol obtained was coated by a dip coating method on a stainless steel foil having a size of 10 cm×10 cm, a thickness Ts of 70 µm and an average surface roughness Ras of 0.1 µm, then dried and baked to obtain an inorganic-organic hybrid film-coated stainless steel foil of the present invention.

The thickness Tf of the thus-obtained inorganic-organic hybrid coat was 0.5 µm. The average roughness Raf on the surface of this coat was as small as 0.012 µm, revealing that the coat has small surface roughness. The ratio [H]/[Si] between hydrogen concentration [H] (mol/l) and silicon concentration [Si] (mol/l) in this coat was 3.0. The electric resistance value R (1 $cm^2$) in the region of 1 $cm^2$ of the coat was $5.3 \times 10^7 \Omega$ and this reveals that the insulating property is high. The pencil hardness of this coat was 5H, revealing high hardness. Also, after a tensile strain of 1% was given to this inorganic-organic hybrid film-coated stainless steel foil and then the foil was restored, the coat surface was observed by SEM. As a result, cracks were not observed, revealing that this coat has high cracking resistance. Furthermore, after the inorganic-organic hybrid film-coated stainless steel foil was heat-treated at 500° C. for 1 hour in vacuum and returned to room temperature, the coat surface was observed by SEM. As a result, cracks were not observed and also no particular change was observed in the flatness of the coat surface, revealing that this coat has excellent heat resistance. With respect to the adhesion, N (100) was 100 in the crosscut adhesion test and this reveals that the adhesion between the inorganic-organic hybrid coat and the stainless steel foil substrate is high.

Comparative Example 1

Tetraethoxysilane (20 mol) was used as the starting material for the preparation of a sol. After adding 20 mol of ethanol thereto, the mixture was thoroughly stirred. Thereafter, while stirring, an aqueous acetic acid solution prepared by mixing 2 mol of acetic acid and 100 mol of water was added dropwise to effect hydrolysis. To the thus-prepared sol, 100 mol of ethanol was added to obtain a final sol.

In the same manner as in Example 1, the sol obtained was coated by a dip coating method on a stainless steel foil having a size of 10 cm×10 cm, a thickness Ts of 70 µm and an average surface roughness Ras of 0.1 µm, then dried and baked to obtain an inorganic-organic hybrid film-coated stainless steel foil of the present invention.

The thickness Tf of the thus-obtained coat was 0.7 µm. The average roughness Raf on the surface of this coat was as small as 0.012 µm, revealing that the coat has small surface roughness. The ratio [H]/[Si] between hydrogen concentration [H] (mol/l) and silicon concentration [Si] (mol/l) in this coat was 0.01. The electric resistance value R (1 $cm^2$) in the region of 1 $cm^2$ of the coat was $8.9 \times 10^6 \Omega$ and this reveals that the insulating property is high. The pencil hardness of this coat was 8H, revealing high hardness. However, after a tensile strain of 1% was given to this stainless steel foil and then the foil was restored, when the coat surface was observed by SEM, a large number of cracks were observed, revealing that this coat has low cracking resistance. After the inorganic-organic hybrid film-coated stainless steel foil was heat-treated at 500° C. for 1 hour in vacuum and returned to room temperature, the coat surface was observed by SEM. As a result, cracks were not observed and also no particular change was observed in the flatness of the coat surface, revealing that this coat has excellent heat resistance. Meanwhile, with respect to the adhesion, N (100) was 76 in the crosscut adhesion test and this reveals that there is a problem in the adhesion between the coat and the stainless steel foil substrate. However, rather than a problem in the adhesion, this test result is probably attributable to the fact that the film flexibility was low and the soundness of the coat was greatly impaired upon cutting to form a square pattern.

Comparative Example 2

A mixture of 18 mol of dihexyldiethoxysilane and 2 mol of propyltriethoxysilane was used as the starting material for the preparation of a sol. After adding 20 mol of ethanol thereto, the mixture was thoroughly stirred. Thereafter, while stirring, an aqueous acetic acid solution prepared by mixing 2 mol of acetic acid and 80 mol of water was added dropwise to effect hydrolysis. To the thus-prepared sol, 300 mol of ethanol was added to obtain a final sol.

In the same manner as in Example 1, the obtained sol was coated by a dip coating method on a stainless steel foil having a size of 10 cm×10 cm, a thickness Ts of 70 μm and an average surface roughness Ras of 0.1 μm, then dried and baked to obtain an inorganic-organic hybrid film-coated stainless steel foil of the present invention.

The thickness Tf of the thus-obtained coat was 0.55 μm. The average roughness Raf on the surface of this inorganic-organic hybrid coat was as small as 0.018 μm, revealing that the coat has small surface roughness. The ratio [H]/[Si] between hydrogen concentration [H] (mol/l) and silicon concentration [Si] (mol/l) in this coat was 24.5. The electric resistance value R (1 cm$^2$) in the region of 1 cm$^2$ of the coat was $2.5 \times 10^7 \Omega$ and this reveals that the insulating property is high. However, the pencil hardness of this coat was 2B, revealing a low hardness. After a tensile strain of 1% was given to this inorganic organic hybrid film-coated stainless steel foil and then the foil was restored, the coat surface was observed by SEM. As a result, cracks were not observed, revealing that this coat has high cracking resistance. Meanwhile, after the inorganic-organic hybrid film-coated stainless steel foil was heat-treated at 500° C. for 1 hour in vacuum and returned to room temperature, when the coat surface was observed with a naked eye, it was confirmed that the surface flatness was already lost. This was confirmed also by the SEM observation and this reveals that the coat has low heat resistance. With respect to the adhesion, N (100) was 100 in the crosscut adhesion test and this reveals that the adhesion between the inorganic-organic hybrid coat and the stainless steel foil substrate is high.

Example 5

Sol A was prepared by dispersing 0.5 mol of methyltriethoxysilane and 0.5 mol of tetramethoxysilane in 3 mol of 2-ethoxyethanol, and adding thereto 0.08 mol of acetic acid as the catalyst and 2 mol of water to effect hydrolysis. Sol B was prepared by dispersing 0.5 mol of triethoxysilane and 0.5 mol of tetramethoxysilane in 6 mol of 2-ethoxyethanol, and adding thereto 0.02 mol of acetic acid as the catalyst and 2 mol of water to effect hydrolysis.

By using a 2 cm-diameter gravure roll of a microgravure coater, Sol A was coated on an SUS304 stainless steel foil at a thickness of 70 μm (surface roughness $R_a$=0.03 μm), a width of 150 mm and a length of 100 m, which had been subjected to bright annealing. The cell capacity of the gravure roll was 10 cm$^3$, and the transfer ratio was 0.33. After the coating, the stainless steel foil was transported to a drying furnace at 170° C., passed therethrough in 1 minute and taken up. Subsequently, Sol B was coated as an uppermost film with use of a gravure roll having a diameter of 2 cm, a cell capacity of 18 cm$^3$ and a transfer ratio of 0.33. After the coating, the stainless steel foil was transported to a drying furnace at 170° C., passed therethrough in 1 minute, heat-treated in a heating furnace at 350° C. for 2 minutes and taken up. The lower film had a thickness of 0.8 μm and the upper film had a thickness of 0.3 μm.

The insulating resistance of the coat film was examined in such a manner that 10 platinum electrodes each having an electrode area of 1 cm$^2$ were formed, a voltage of 5 V was applied between the electrode surface and the back surface of the stainless steel foil, and the number of electrodes having a surface resistance of 1 MΩ·cm$^2$ or more was counted. As a result, insulation was achieved on 10 electrodes, revealing good insulating resistance.

The heat resistance was examined by heat-treating the inorganic-organic hybrid film-coated stainless steel foil at 400° C. for 30 minutes in vacuum and then subjecting the foil to a crosscut adhesion test. More specifically, the inorganic-organic hybrid film-coated stainless steel foil fixed on a quartz plate was scratched to form a pattern of 100 squares of 1 mm×1 mm, a scotch tape was attached to the scratched portions and then peeled off and, if the number of squares remaining unstripped out of 100 squares was N (100), N (100) was 100, revealing good heat resistance.

With respect to the adhesion to a device layer, Mo having a small thermal expansion coefficient was film-formed by sputtering and evaluated by the same crosscut adhesion test as above, as a result, N (100)=95, revealing good adhesion.

Example 6

Sol C was prepared by dispersing 1 mol of methyltriethoxysilane in 6 mol of ethanol, and adding thereto 0.08 mol of acetic acid as the catalyst and 3 mol of water to effect hydrolysis. Sol D was prepared by dispersing 1 mol of tetramethoxysilane in 6 mol of ethanol, and adding thereto 0.02 mol of acetic acid as the catalyst and 3 mol of water to effect hydrolysis.

Sol C was coated by using a bar coater #10 on a 100 mm-square SUS430 stainless steel foil with a thickness of 60 μm (surface roughness $R_a$=0.03 μm), which had been subjected to bright annealing, and dried in an oven at 200° C. for 1 minute. Subsequently, Sol D was coated thereon by a dip coater at a pull-out rate of 2 mm/sec and then dried in an oven at 200° C. for 1 minute. Thereafter, the stainless steel foil was heat-treated in an electric furnace at 400° C. for 30 minutes in nitrogen. The lower film had a thickness of 1.3 μm and the upper film had a thickness of 0.5 μm.

The same evaluations as in Example 5 were performed.

The insulating resistance of the coat film was good and achieved insulation on 10 electrodes.

The heat resistance was good and gave a result of N (100)=100 in the crosscut adhesion test performed after heat-treating the inorganic-organic hybrid film-coated stainless steel foil at 400° C. for 30 minutes in vacuum.

The adhesion to a device layer was good and had a result of N (100)=90 in the crosscut adhesion test of an No film formed by sputtering.

Example 7

Sol E was prepared by dispersing 0.2 mol of methyltrimethoxysilane and 0.8 mol of tetramethoxysilane in 3 mol of 2-ethoxyethanol, adding thereto 0.08 mol of acetic acid as the catalyst and 2 mol of water to effect hydrolysis, thereby obtaining a sol, and further adding thereto 0.01 mol polydimethylsiloxane having a mass average molecular weight of 800. Sol F was prepared by dispersing 0.2 mol of triethoxysilane and 0.8 mol of tetramethoxysilane in 6 mol of 2-ethoxyethanol, and adding thereto 0.02 mol of acetic acid and 0.02 mol of tetraethoxytitanium as the catalyst and 2 mol of water to effect hydrolysis.

Sol E was coated by using a bar coater #14 on a 100 mm-square SUS430 stainless steel foil with a thickness of 100 μm (surface roughness $R_a$=0.02 μm), which had been subjected to buff polishing, and dried in an oven at 200° C. for 1 minute. Subsequently, Sol F was coated thereon by a dip coater at a pull-out rate of 2 mm/sec and then dried in an oven at 200° C. for 1 minute. Thereafter, the stainless steel foil was heat-treated in an electric furnace at 400° C., for 30 minutes, in nitrogen. The lower film had a thickness of 3.0 μm and the upper film had a thickness of 0.5 μm.

The insulating resistance of the coat film was good and achieved insulation on 10 electrodes.

The heat resistance was good and had a result of N (100)=95 in the crosscut adhesion test performed after heat-treating the inorganic-organic hybrid film-coated stainless steel foil at 400° C. for 30 minutes in vacuum.

The adhesion to a device layer was good by having a result of N (100)=90 in the crosscut adhesion test of Mo film formed by sputtering.

Comparative Example 3

Sol A prepared in Example 5 was coated by using a bar coater #7 on a 100 mm-square SUS304 stainless steel foil with a thickness of 70 μm (surface roughness $R_a$=0.03 μm), which had been subjected to bright annealing, and dried in an oven at 200° C. for 1 minute. Thereafter, the stainless steel foil was heat-treated in an electric furnace at 400° C. for 30 minutes in nitrogen. The film thickness was 1.2 μm.

The insulating resistance of the coat film was good and achieved insulation on 10 electrodes.

The heat resistance was good and had a result of N (100)=95 in the crosscut adhesion test performed after heat-treating the inorganic-organic hybrid film-coated stainless steel foil at 400° C. for 30 minutes in vacuum.

The Mo film formed by sputtering was separated immediately after the stainless steel foil was taken out from the vacuum chamber, suggesting that the adhesion to a device layer is poor.

Comparative Example 4

Sol B prepared in Example 1 was coated by using a bar coater #3 on a 100 mm-square SUS304 stainless steel foil with a thickness of 70 μm (surface roughness $R_a$=0.03 μm), which had been subjected to bright annealing, and dried in an oven at 200° C. for 1 minute. Thereafter, the stainless steel foil was heat-treated in an electric furnace at 400° C. for 30 minutes in nitrogen. The film thickness was 0.4 μm.

The insulating resistance of the coat film was not good and achieved insulation on only one electrode.

The heat resistance was good by having a result of N (100)=100 in the crosscut adhesion test performed after heat-treating the inorganic-organic hybrid film-coated stainless steel foil at 400° C. for 30 minutes in vacuum.

The adhesion to a device layer was good by having a result of N (100)=90 in the crosscut adhesion test of No film formed by sputtering.

INDUSTRIAL APPLICABILITY

First, the present invention provides a stainless steel foil excellent in heat resistance, processability, flatness, insulating property and the like by coating an inorganic-organic hybrid film on the stainless steel foil. Accordingly, when this stainless steel foil is applied to an electronic material substrate or the like, various electronic devices which are adaptable to extreme process conditions such as high temperature or severe processing, as well as flexible or reduced in the weight are realized. Thus, its industrial effect is very great. Secondly, according to the present invention, a stainless steel foil coated with a plurality of silica film layers is obtained, and a lightweight insulating substrate with flexibility can be provided for uses in various electric.electronic components including a solar cell. This stainless steel is excellent in the insulating property, heat resistance and adhesion to a device layer and therefore, is effective, in particular, when the production of a device involves a high-temperature treatment at 400° C. or more.

The invention claimed is:

1. An inorganic-organic hybrid film-coated stainless steel foil for an electrically insulating substrate material, comprising a stainless steel foil substrate coated on one surface or both surfaces with a first inorganic-organic hybrid film,
wherein said first inorganic-organic hybrid film comprises a skeleton formed of an inorganic three-dimensional network structure mainly comprising a siloxane bond, with at least one crosslinked oxygen of said skeleton being replaced by a first organic group and/or a hydrogen atom, and the ratio [H]/[Si] between hydrogen concentration [H] (mol/l) and silicon concentration [Si] (mol/l) in said first inorganic-organic hybrid film satisfies the condition of 0.3≤[H]/[Si]≤3;
wherein said organic group of said first inorganic-organic hybrid film is an alkyl group having 1 to 4 carbons;
wherein a thickness Tf of said inorganic-organic hybrid film satisfies the condition 0.5 μm≤Tf≤2 μm;
wherein the thickness Tf of said inorganic-organic hybrid film and a thickness Ts of said stainless steel foil substrate satisfy the condition of Tf≤Ts/40;
wherein the thickness Tf of said inorganic-organic hybrid film and an average roughness Ras of the surface of said stainless steel foil substrate satisfy the condition of Ras≤Tf/2; and
wherein said inorganic-organic hybrid film-coated stainless steel foil further comprises an uppermost film of an inorganic layer of $SiO_2$ or a second inorganic-organic hybrid film on said first inorganic-organic hybrid film;
wherein said second inorganic-organic hybrid film comprises a skeleton formed of an inorganic three-dimensional network structure mainly comprising a siloxane bond, with at least one crosslinked oxygen of said skeleton being replaced by a second organic group and/or a hydrogen atom, and the ratio [H]/[Si] between hydrogen concentration [H] (mol/l) and silicon concentration [Si] (mol/l) in said film satisfies the condition of [H]/[Si]<1.0.

2. The inorganic-organic hybrid film-coated stainless steel foil as claimed in claim 1, wherein said second organic group is one or more member selected from the group consisting of an alkyl group, an aryl group, a hydroxyl group, a carboxyl group and an amino group.

3. The inorganic-organic hybrid film-coated stainless steel foil as claimed in claim 1, wherein the average roughness Raf of the surface of said uppermost inorganic-organic hybrid film satisfies the condition of Raf≤0.02 μm.

4. The inorganic-organic hybrid film-coated stainless steel foil as claimed in claim 1, wherein the thickness Tf of said uppermost inorganic-organic hybrid film and the average roughness Ras of the surface of said stainless steel foil substrate satisfy the condition of Ras≤Tf/10.

5. The inorganic-organic hybrid film-coated stainless steel foil as claimed in claim 1, wherein the thickness Tf of said uppermost inorganic-organic hybrid film and the average roughness Ras of the surface of said stainless steel foil substrate satisfy the condition of Ras≤Tf/20.

6. The inorganic-organic hybrid film-coated stainless steel foil as claimed in claim 1, wherein the thickness Ts of said stainless steel foil substrate has a thickness of 100 μm or less.

7. The inorganic-organic hybrid film-coated stainless steel foil as claimed in claim 1, wherein the thickness Ts of said stainless steel foil substrate has a thickness of 10 to 100 μm.

* * * * *

UNITED STATES PATENT AND TRADEMARK OFFICE
CERTIFICATE OF CORRECTION

PATENT NO.        : 8,586,190 B2
APPLICATION NO.   : 12/831027
DATED             : November 19, 2013
INVENTOR(S)       : Keiko Kawakami et al.

It is certified that error appears in the above-identified patent and that said Letters Patent is hereby corrected as shown below:

In the Specification

Column 2, line 66, change "TIN" to -- TiN --;

Column 3, line 16, change "an Mo" to -- a Mo --;

Column 7, line 15, change "Tf≤Ts20" to -- Tf≤Ts/20 --;

Column 8, line 62, change "M-O—Si" to -- M-O–Si --;

Column 13, line 64, change "R(1 cm$^2$) ≤ 1×10$^6$Ω" to -- R(1 cm$^2$) ≥ 1×10$^6$Ω --;

Column 19, line 4, change "an No" to -- a Mo --;

Column 20, line 10, change "of No" to -- of Mo --.

Signed and Sealed this
Fifth Day of August, 2014

Michelle K. Lee
*Deputy Director of the United States Patent and Trademark Office*